(12) United States Patent
Gorecki et al.

(10) Patent No.: US 9,344,285 B2
(45) Date of Patent: May 17, 2016

(54) METHOD AND SYSTEM FOR PRESERVING PRIVACY AND ACCOUNTABILITY

(71) Applicant: AGT International GmbH, Zurich (CH)

(72) Inventors: Christian Gorecki, Darmstadt (DE); Florian Zeiger, Darmstadt (DE)

(73) Assignee: AGT International GmbH, Zurich (CH)

( * ) Notice: Subject to any disclaimer, the term of this patent is extended or adjusted under 35 U.S.C. 154(b) by 66 days.

(21) Appl. No.: 14/357,051

(22) PCT Filed: Nov. 7, 2012

(86) PCT No.: PCT/EP2012/072003
§ 371 (c)(1),
(2) Date: May 8, 2014

(87) PCT Pub. No.: WO2013/068383
PCT Pub. Date: May 16, 2013

(65) Prior Publication Data
US 2014/0304519 A1 Oct. 9, 2014

(30) Foreign Application Priority Data
Nov. 8, 2011 (EP) .................................... 11188153

(51) Int. Cl.
*H04L 29/06* (2006.01)
*H04L 9/32* (2006.01)
*G06Q 20/38* (2012.01)

(52) U.S. Cl.
CPC ............ *H04L 9/3281* (2013.01); *H04L 63/045* (2013.01); *H04L 63/0421* (2013.01); *G06Q 20/383* (2013.01); *H04L 63/061* (2013.01); *H04L 2209/72* (2013.01); *H04L 2463/062* (2013.01)

(58) Field of Classification Search
CPC . H04L 63/04; H04L 63/0407; H04L 63/0414; H04L 63/0421; H04L 63/045; H04L 63/061; H04L 9/3281; H04L 2209/72; H04L 2463/062; G06Q 20/383

USPC .......................................................... 713/171
See application file for complete search history.

(56) References Cited

U.S. PATENT DOCUMENTS

| | | | |
|---|---|---|---|
| 7,181,017 B1 * | 2/2007 | Nagel | H04L 9/0825 380/282 |
| 2002/0126850 A1 * | 9/2002 | Allen | H04L 9/0825 380/277 |
| 2007/0130070 A1 * | 6/2007 | Williams | G06Q 30/02 705/50 |

OTHER PUBLICATIONS

European Search Report from EP Application No. 11188153 dated Apr. 4, 2012.
International Search Report together with Written Opinion from PCT/EP2012/072003 dated Feb. 14, 2013.

* cited by examiner

*Primary Examiner* — Yogesh Paliwal
(74) *Attorney, Agent, or Firm* — Mark S. Cohen; Pearl Cohen; Zedek Latzer Baratz LLP

(57) ABSTRACT

A computer implemented method, computer program product, server and clients for preserving privacy and accountability. The server receives from a first client computer pseudonymous, encrypted data and stores the pseudonymous, encrypted data. The -server further receives receiving at from a second client computer a data request for the pseudonymous, encrypted data and provides the pseudonymous, encrypted data to the second client computer in response to the data request. The server receives from the second client computer a signed key request for at least one key, wherein the at least one key is configured to decrypt the pseudonymous, encrypted data and wherein the signed key request comprises a public key of the second client computer. The server receives from the first client computer the at least one key, wherein the at least one key is encrypted with the public key of the second client computer and provides the at least one encrypted key to the second client computer in response to the signed key request.

21 Claims, 5 Drawing Sheets

METHOD AND SYSTEM FOR PRESERVING PRIVACY AND ACCOUNTABILITY

CROSS-REFERENCE TO RELATED APPLICATIONS

This application is a National Phase Application of PCT International Application No. PCT/EP2012/072003, International Filing Date Nov. 7, 2012, claiming priority of EP Patent Application No. 11188153.8, filed Nov. 8, 2011, both of which are hereby incorporated by reference.

TECHNICAL FIELD

The present invention generally relates to electronic data processing, and more particularly, relates to methods, computer program products and systems for privacy preserving communication between multiple computers.

BACKGROUND

In more and more collaborative or so called crowdsourcing applications users of computer systems contribute data content to those applications. In such scenarios often a trade-off between privacy of the user and accountability of contributed data has to be found. However, privacy of user data and accountability of content are key elements in providing trustworthy services. Generally, systems either favor privacy of the user or guarantee accountability. Privacy of data has two different aspects: the right of the user to disclose or not disclose his or her identity and the user's control over the contributed data provided. However, control over the contributed data requires accountability to some extent. Accountability on the other hand means that the origin or any manipulation of the data is traceable so that a respective user is accountable for the data. This is in contraction to the privacy aspect of non-disclosing the user's identity.

On the one hand, users should be provided with a maximum of privacy, e.g., non-disclosure of their current location or taken routes, in order to favor unconcerned participation. On the other hand, participation should be reimbursed (incentives, access to content provided by others, etc.), so users are motivated in order to join in the crowdsourcing application and hence accountability is required to some extent. In current implementations the tradeoff between privacy and accountability has to be found.

SUMMARY

Therefore, there is a need to improve the collaborative use of data by preserving privacy of the data and ensuring accountability for the data at the same time. This problem is solved by methods, computer program products and computer systems describing different aspects of the present invention as described in the independent claims 1, 14, 15, 17 and 19.

The different aspects of the invention allow the user to contribute data in a privacy preserving manner. At the same time a degree in accountability is provided, which allows the user to finally request a reimbursement for the contributed data and ensure that the reimbursement is not paid to a wrong party.

Data producing users can submit data anonymously to a server by using appropriate client devices. Authenticated data consuming users can request data from the server platform. The data producing users have complete control over their own data and can decide who, e.g., which data consuming users, will be granted access to the data. Finally a data producing user may receive a reimbursement for the contributed data from a reimbursement entity, wherein the reimbursement is not directly associated anymore with specific contributed data sets, which were provided by the data producing user previously. Throughout all the time, neither the server nor any data consuming user or client can relate the content of a single data set to the real identity of the respective data producing user.

In other words, aspects of the invention enable reimbursement in a multiple data producer, multiple data consumer scenario without neglecting neither privacy of the data producing users nor their accountability with respect to reimbursement. Regarding privacy, both, the data producer's control over the contributed data and the right to (not) disclose his/her identity are preserved. Regarding accountability, secure reimbursement to the data producing user for the contributed data is supported. Resolving contributed data to the identity of the data producing user, who contributed the data, is impossible throughout the entire process, except for the data producer himself/herself. This is achieved without requiring a trusted third party. Instead a non-trusted third party (non-trusted server) may be employed. It is notified that in the following description it is mainly referred to an embodiment using a non-trusted server but embodiments of the disclosed invention can also work in combination with a trusted server.

Data producers, non-trusted third party, data consumers, and paying agent communicate in a way, so that data producers can submit data anonymously to the non-trusted third party platform. Authenticated data consumers can request data from the non-trusted server platform while data producers have complete control over own data in terms of granting access to the data requested. The data producer can receive a reimbursement for his data contribution without being related to his identity.

A first aspect of the invention is described as a computer implemented method for preserving privacy and accountability according to claim 1. The method is executed by a non-trusted server computer when, for example, the server is running a corresponding computer program according to claim 13. The non-trusted server computer receives pseudonymous, encrypted data from a first client computer. The first client computer can be a device used by a data producing user for generating and encrypting data, which is of a certain interest for one or more data consuming users. The device can be any client computer, such as a mobile phone, a tablet PC a personal computer or any other device supporting the collection and submission of data. For example, the first client device can run crowdsourcing applications where users contribute data information unsolicited. Other devices with integrated sensor capabilities may be used for participatory sensing scenarios where participants (data producing users) are requested to collect data anonymously. For example, the pseudonymous data may be current sensor measurement data for particulate matter at the location of the data producing user. Pseudonymous data is data having a unique identifier which can be selected by the data producing user in a random fashion but which otherwise is not correlated with the data producing user in a way visible to other parties. The unique identifier, which is used as pseudonym by a data producing user, does not need to be static over time. It can be changed automatically or in response to a user action.

The non-trusted server computer can then store the pseudonymous, encrypted data in an appropriate data storage component. The data storage component can be an integrated part of the non-trusted server, e.g., a hard disk or RAM component with a corresponding database, but may also be part of cloud architecture remotely accessible by the non-trusted server.

The non-trusted server computer may then receive a data request for the pseudonymous, encrypted data from a second client computer. The second client computer can be any client computer device used by a data consuming user. For example, a city authority officer may be interested in current sensor measurement data for particulate matter in a certain geographical area which includes the data producing user's location associated with the pseudonymous, encrypted data. In such an embodiment the pseudonymous, encrypted data may be associated with non-encrypted data, such as geographic data or any other attributes, which may be appropriate to categorize or classify the pseudonymous, encrypted data.

The non-trusted server computer may then provide the pseudonymous, encrypted data to the second client computer. At this moment, the requesting data consuming user has received the encrypted data on the second client computer. However, interpretation of the data is not yet possible because of the encryption of the data. The data request may be sent in a way, so that the data consuming user is uniquely accountable for it. For example the data request may include a unique identifier or a digital signature of the data consuming user. Each data consuming user may have a corresponding certificate to be used for uniquely signing the respective data requests. The certificates may be issued by a trusted authority. The signatures may only be valid over a certain period of time after which they can be changed or renewed. Any data consuming user may request data provided by the non-trusted server. Since the non-trusted server has only encrypted data, the request can be served, but the respective data consumer client will not be able to decrypt the data, and therefore, will not be able to make any use of the data without the corresponding keys enabling decryption of the data. These in turn, are only known by the data producing (first) client computer. Therefore, the data producing user has full control on whether a data consumer is allowed to access the data, or not, which depends on whether the data consumer client computer will finally get the keys needed for decryption. The data producing user's contributed data is also not visible to the non-trusted server and therefore cannot be resolved to the data producing user's identity by the data consuming user. To make sure that the non-trusted server cannot derive the identity of a data producing user, for example by analyzing IP addresses of the data producing users, known anonymization techniques, such as IPv4 or IPv6 address anonymization or so called real-time mixes may be used. The term onion routing is often used for this type of anonymization techniques.

If the data consuming user wants to access the data, the respective second client computer can send a signed key request for at least one key to the non-trusted server computer. The requested at least one key is configured to decrypt the pseudonymous, encrypted data. Further, the signed key request includes a public key of the second client computer. The signed key request is then received by the non-trusted server. The second client is therefore authenticated because the signature of the second client is included in the key request. Because of the privacy-preserving mechanism with regards to the data producing user the non-trusted server cannot forward the request directly to the first client computer. Instead the first client computer may query the data requests on the non-trusted server and identify requests associated with the pseudonymous, encrypted data provided by the first client.

The first client thereby knows the requesting second client because of the signature included in the key request. After the first client has identified the request for the at least one key it may encrypt the at least one key with the public key of the second client computer, which was also included in the key request. The first client computer finally sends the at least one encrypted key to the non-trusted server. Once the non-trusted server receives the at least one encrypted key, as a consequence, only the second client computer will be able to use the encrypted key because no other party will be able to decrypt the at least one encrypted key. That is, no matter which client is going to retrieve the at least one encrypted key, only the correct addressee, in the example the second client computer, will be able to decrypt the information. As the identity of the second client computer is known because of the signature in the original key request, the non-trusted server can provide the at least one encrypted key to the second client computer by a push service. Alternatively, the second client computer may query the non-trusted server computer for the response to the key request and retrieve the at least one encrypted key using a pull mechanism.

The second client computer may then decrypt the at least one encrypted key by using its own private key in combination with its public key. Now the second client computer is in possession of the at least one decrypted key which is needed for decrypting the pseudonymous, encrypted data. It can now finally decrypt the pseudonymous, encrypted data by using the at least one decrypted key.

Other aspects of the invention like the non-trusted server, the data consumer client and the data producer client can be implemented as described in the claims 14, 16 and 18, respectively.

Further advantageous embodiments of the invention are described in the dependent claims. For example, claims 2 to 5 provide a compensation scheme for the data producer client (first client). In other words, the data producer client is enabled to request reimbursement for providing data. This is enabled by the non-trusted server receiving from the second client (data consumer client) computer signed, encrypted transaction data, wherein the transaction data is encrypted with a public key of the first client computer. For example, the public key of the first client computer may have been included either in the pseudonymous, encrypted data or in the response with the at least one encrypted key. The public key of the first client computer may also be made available on the non-trusted server. Both ways the second client computer can get knowledge about the public key of the first client computer and use this public key for decrypting the transaction data. The transaction data can include a transaction identifier and a transaction value, wherein the transaction value represents an amount to be paid out to the data producing user as a reimbursement for providing the contributed data to the data consuming user. The transaction number is an identifier allowing to uniquely distinguish between different transactions.

Upon receipt of the signed, encrypted transaction data the non-trusted server stores this data because again the intended recipient of the data, namely the first client computer, is not known to the non-trusted server.

The first client can then query the non-trusted server for transaction data related to its data contributions. For example, the first client may simply request all available transaction data in a kind of brute force mechanism and may try to decrypt each transaction data. The transaction data where the first client succeeds with decryption were encrypted with its respective public key and are therefore correspond to the searched data sets. In another embodiment partial encryption may be used, where the pseudo ID of the first client computer is stored by the non-trusted server and the first client can query only transaction data associated with its own pseudo ID. Once the signed, encrypted transaction data is identified by the first client, it can retrieve the encrypted transaction data and decrypt the data by using its own private key that is related to the public key of the first client computer, which was used for encryption by the second client computer. The first client computer can also relate the transaction data to the respective data consumer client because of the signature included in the transaction data. Finally the first client computer may request a reimbursement from a reimbursement entity in accordance with the decrypted transaction data. In other words, a reimbursement according to the transaction value can be paid out to the data producing user by the reimbursement entity. There is no linkage between the reimbursement entity and the data consuming user in respect to the identity of the data producing user. That is, the privacy of the first client computer and therefore the data producing user is fully preserved.

DETAILED DESCRIPTION

Figure 1:
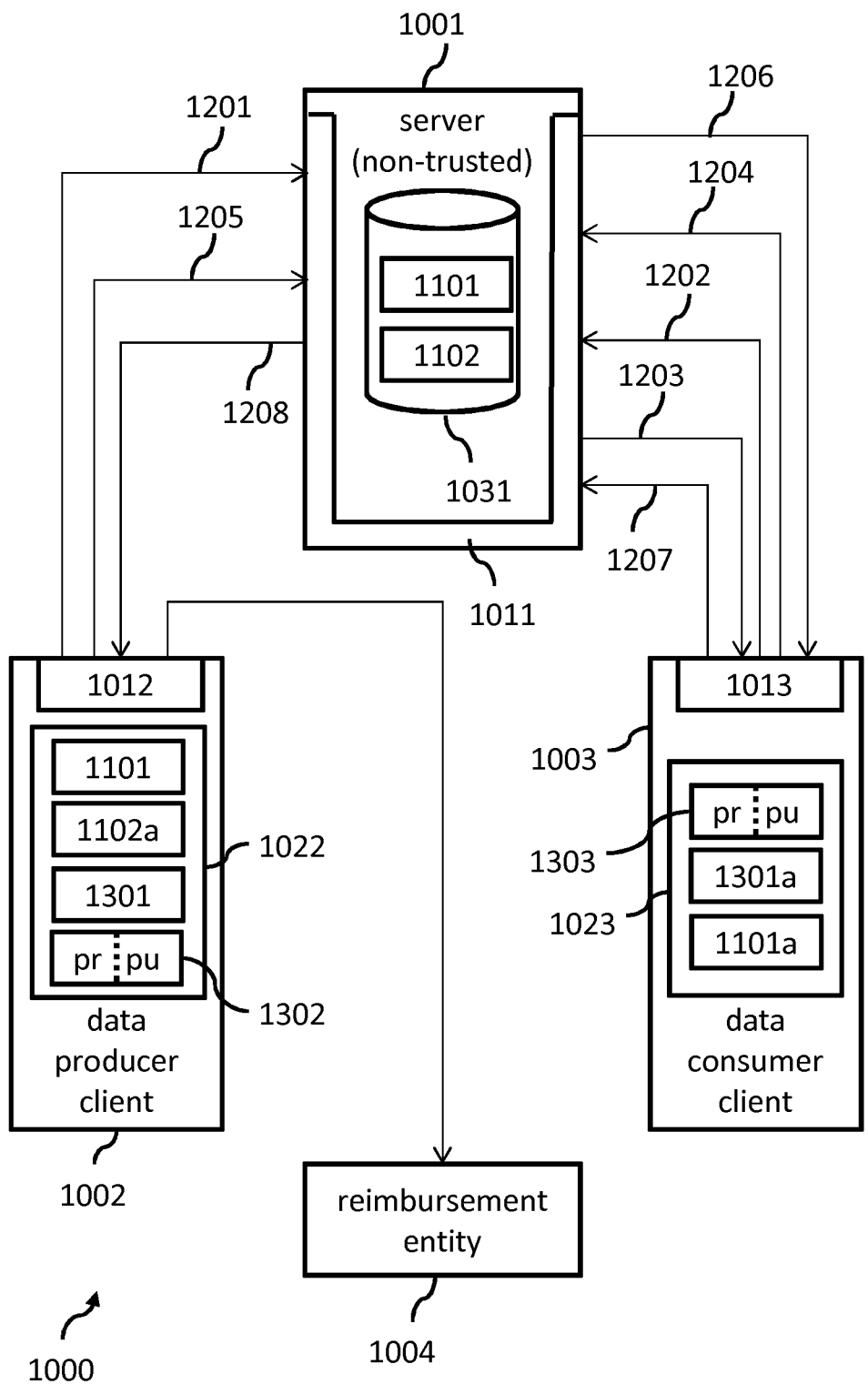
FIG. 1 is a simplified computer system according to one embodiment of the invention.

FIG. 1 is a simplified computer system 1000 according to one embodiment of the invention. The computer system 1000 includes a non-trusted server computer 1001 and at least a first client computer 1002, also referred to as data producer client herein after, and at least a second client computer 1003, also referred to as data consumer client herein after. The terms client and client computer are intended to have the same meaning herein after. There can be any number of data producer clients and any number of data consumer clients in the computer system 1000. Each data producer client and each data consumer client is communicatively coupled with the non-trusted server. However, there is no direct communication linkage between data consumer clients and data producer clients. The identities of data producer clients 1002 are neither known to the non-trusted server 1001 nor to any data consumer client 1003. Each data producer client 1002 communicates with the non-trusted server 1001 by using a pseudonym, e.g. a pseudo identifier (ID), which can be changed by the respective data producer client 1002 any time. Using appropriate anonymization techniques, such as IPv4 address anonymization or so called real-time mixes, the computer system 1000 can avoid that the non-trusted server may analyze the data producer clients' IP addresses and derive their identities.

A data producer client 1002 in general is a device with a data producing capability. For example, such a data producing capability can include running crowdsourcing applications, where the data producer client is collecting data from other devices/clients, which may communicate the data producer client through networks like ad-hoc networks or wireless sensor networks. In another embodiment the data producer client itself may include integrated sensor capabilities to produce sensor data, such as the current carbon dioxide or humidity levels or current sensor measurement data for particulate matter at the location of the data producing user. For example, commercially available smartphones or specialized mobile environmental sensor devices show such capabilities. The produced data may be relevant for data consuming parties, such as official authorities for environmental monitoring or traffic coordination in cities.

Therefore, the data producing user may be interested to provide the data to data consuming users if he or she can gain some individual advantage by providing the data. On the other hand the data producing user can be an individual, who would like to stay anonymous and have his privacy respected in the computer system 1000. For example, in order to enable crowdsourcing applications and scenarios the challenge in finding participants is twofold. On the one hand, users should be provided with a maximum of privacy, e.g., non-disclosure of their current location or taken routes, in order to favor unconcerned participation. On the other hand, participation should be reimbursed (incentives, access to content provided by others, etc.), so that users are motivated to join in the crowdsourcing application. Hence accountability is required.

To provide privacy and accountability in a coexisting fashion the data producer client 1002 of the user includes an interface component 1012, which is configured to send pseudonymous, encrypted data 1201 to the non-trusted server computer 1001. In other words, the data, which is sent to the non-trusted server, acting primarily as a platform for data exchange between data producer clients and data consumer clients, is associated with a pseudo ID. The pseudo ID is a unique identifier of the data producer client which can be selected by the data producing user in a random fashion and which does not need to be static over time. The data, which the data producing user intends to contribute, can be encrypted by a data processing component 1022 of the data producer client 1002. For example, the data producer client may use a public key infrastructure to generate keys for encryption. In another embodiment a data producer client can simply generate its own key pairs and then provide the public key of the generated key pair to the non-trusted server for public key exchange. At least one key 1301 may be used to encrypt the data to be contributed for generating the encrypted data 1101. However, the pseudo ID is added as a non-encrypted portion to the encrypted data 1101. Further embodiments with using multiple keys are described under FIG. 6.

As the pseudo ID of the data producer client is not known by any other party of the computer system 1000 and as the data, which is sent from the data producer client to the non-trusted server 1001, is encrypted with at least one key which is only known by the data producer client, no other party can make sense of the pseudonymous, encrypted data 1101, which is received by an interface component 1011 of the non-trusted server and stored by a respective data storage component 1031 on the non-trusted server 1001 or on any remote data storage device accessible by the non-trusted server.

A data consumer client 1003, which is interested in the encrypted data 1101 stored on the server 1001 can send a data request 1202 for the pseudonymous, encrypted data 1101 to a non-trusted server computer 1001 through an appropriate interface component 1013. The interface component can implement any standard interface, because it is one aspect of the invention that no further specific requirements with regards to security or data protection need to be fulfilled by the non-trusted server. Such a data request may be sent by the data consumer client 1003 even before the respective data is provided by the data producer client 1002. The data producer client 1002 can finally provide the data with a certain delay or even not at all. The non-trusted server may then provide the pseudonymous, encrypted data 1101 to the second client computer 1003 in response 1203 to the data request 1202. Once the pseudonymous, encrypted data 1101 is received by the data consumer client 1003 through the interface 1013, the data consumer has the data but still cannot make sense of the data because it cannot decrypt the data at this stage. Further, the data consumer client 1003 does not know from which data producer client the encrypted data originated and thus cannot ask the data producer client directly for the key to decrypt the received data.

Therefore, the data consumer client may send a signed key request 1204 for the at least one key 1301, which is needed to decrypt the pseudonymous, encrypted data 1101, to the non-trusted server 1001. The data consumer client can generate a public-private-key pair 1303, e.g. by using a public key infrastructure, and may further include in the signed key request 1204 its public key 1303-*pu*. Further, the signed key request may include the pseudo ID of the data producer client 1002. The key request 1204 can be signed using an electronic signature like a digital certificate which uniquely identifies the data consumer client. More sophisticated methods, such as digital signatures based on asymmetric cryptography may also be used for signing the key request.

Once the signed key request 1204 is received by the non-trusted server 1001, the data producer client 1002 can query the non-trusted server for key requests which include its own pseudo ID. The data producer client can then retrieve the identified key requests and respond 1205 to the respective requests. In the example of the signed key request 1204 of the data consumer client the data producer client encrypts the at least one key 1301 with the public key 1303-*pu* of the second client computer 1003, which is included in the key request, and sends the at least one encrypted key 1301 to the non-trusted server computer 1001 while indicating the data consumer client as the intended receiver. Forwarding the at least one encrypted key to the data consumer client may be possible because the identity of the data consumer client is revealed to the data producer client via the signature of the signed key request. In another embodiment the data consumer client 1003 may simply query the non-trusted server for all data sets with the same pseudo ID and then try to decrypt the retrieved datasets by using a kind of brute force approach.

In other words, the non-trusted server can actively provide, that is, forward, the at least one encrypted key 1301 in response 1206 to the signed key request 1204 to the data consumer client 1003. Alternatively, the data consumer client 1003 can query the non-trusted server for potential responses to key requests including the pseudo ID of the respective data producer client and retrieve all respective encrypted key responses from the non-trusted server.

The data consumer client 1003 can then decrypt the at least one encrypted key 1301 by using its own private key 1303-*pr* which is related to the public key 1303-*pu* of the data consumer client computer, which was used by the data producer client for encrypting the at least one key 1301. At this stage the data consumer client is in possession of the at least one decrypted key 1301*a* which is needed to decrypt the pseudonymous, encrypted data 1101. By applying the at least one decrypted key 1301*a* to the pseudonymous, encrypted data 1101, the data consumer client can finally access the pseudonymous decrypted data 1101*a*.

At this stage the goal of the data consumer user to finally access the decrypted data 1101*a* related to the original data request 1202 is achieved. The identity of the data producer client is still completely hidden because neither the non-trusted server nor the data consumer client know anything else about the data producer client than its pseudo ID, which may be changed by the data producing user any time.

However, to motivate the data producing user to contribute data also for future transactions, the data consuming user may want to reimburse the data producing user for the efforts to provide data to the non-trusted server. Because the data producer client is unknown to the other parties the data consumer client 1003 may send signed, encrypted transaction data 1102 to the non-trusted server 1001. The encrypted transaction data may include a transaction number, which is related to the received data set 1101*a*, and a transaction value, which represents the compensation value to be paid to the data producing user as a reimbursement for the data provisioning. The encrypted transaction data 1102 is signed by the data consumer client so that the data producer client can clearly correlate the compensation value with the data consumer client/user. To prevent other data producers from using the transaction data to their own, unjustified benefit, the data consumer client encrypts the transaction data with the public key 1302-*pu* of the first client computer 1002.

For example, the public key 1302-*pu* of the first client computer 1002 may be transmitted to the consumer client 1003 either by adding it to the pseudonymous, encrypted data 1101 or by adding it to the at least one encrypted key 1301 in the response to the signed key request. In another embodiment, the data producer client 1002 may simply publish its public key 1302-*pu* on the non-trusted server in combination with its pseudo ID. In this embodiment each data consuming client can easily retrieve the public key 1302-*pu* of the data producer client for encrypting any transaction data related to data contributed under the respective pseudo ID. In yet another embodiment the public key 1302-*pu* of the data producing client 1002 may at the same time serve as its pseudo ID. The advantage of this embodiment is that the data producing client can change the pseudo ID without any risk of being identified by a stable public key. Further, less memory is consumed by this embodiment because there is no need to store pseudo IDs and public keys of the data producer clients on the non-trusted server, which also leads a reduced data redundancy on the non-trusted server.

The data producer client 1002 can query the non-trusted server for transaction data related to its own data contributions. For example, the query may be limited to select only encrypted transaction data, which were provided by data consumer clients within a specified time interval or it may select all transaction data available for the data producer client's pseudo ID. Even a retrieval of all encrypted transaction data on the non-trusted server would be possible. Once the data producer client receives the signed, encrypted transaction data 1102 from the non-trusted server computer 1001 it can decrypt the signed, encrypted transaction data 1102 by using its own private key 1302-*pr* which is related to the public key 1302-*pu* of the data producer client computer 1002. The public key 1302-*pu* of the data producer client computer 1002 was received earlier by the data consumer client and was used for the encryption of the transaction data 1102 by the data consumer client. The data producer client can also apply a brute force mechanism for transaction data decryption in case that all available transaction data on the non-trusted server were received. In this case the data producer client simply tries to decrypt any transaction request but it will only succeed for those transaction requests that had been originally encrypted with its public key 1302-*pu*.

After successful decryption of the signed encrypted transaction data 1102, the data producer is in possession of the signed decrypted transaction data 1102*a*, revealing details for a reimbursement of the data producing user according to the contributed data. Such details include the information about the data consumer client (signature), a transaction number related to the contributed data sets and a transaction value indicating or representing the value of the reimbursement. The data producer client can then send a request for reimbursement to a reimbursement entity 1004 in accordance with the decrypted transaction data 1102a. In other words, the reimbursement entity receives a transaction number and will pay out the remuneration to the data producing user in line with the transaction value. The reimbursement entity 1004 is completely independent of the data consumer clients and, therefore, the privacy of the data producer client is preserved. For example, the reimbursement entity can collect the money which was paid out to data producing users from the data consuming users by simply proving the pay out through the respective transaction numbers correlated with the respective data consumer user without revealing anything about the data producing users. The data consumer user is always known from the signature of the transaction data.

Figure 2:
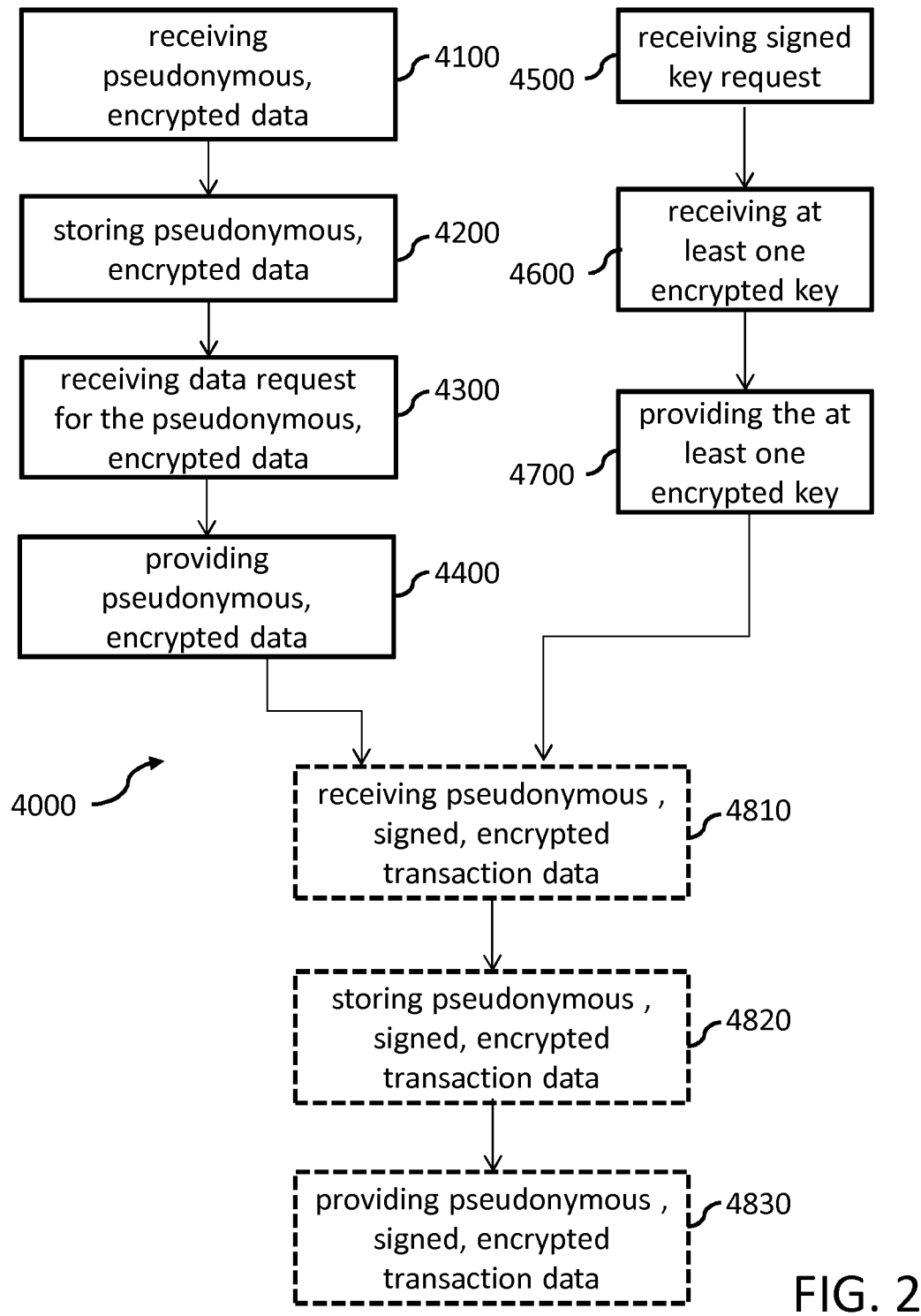
FIG. 2 is a simplified flow chart of a first computer implemented method according to one embodiment of the invention executed by a non-trusted server.

FIG. 2 is a simplified flow chart of a first computer implemented method 4000 for preserving privacy and accountability according to the invention executed by the non-trusted server 1001. The flowchart illustrates that the method steps 4100 to 4400 in respect to the pseudonymous, encrypted data 1101 (cf. FIG. 1) have no causal relationship with the method steps 4500 to 4700 regarding the handling of the signed key request 1204 (cf. FIG. 1). For the execution of the method it does not matter whether the data producer client provides the encrypted data before or after the at least one encrypted key. This is illustrated by the parallel branches of the flow chart. The left branch is directed to the data transfer whereas the right branch corresponds to an authorization process for the data consumer client in the sense of having a clear and transparent link between a data consumer client's public key and its identity. Only with regards to the encrypted transaction data the delivery of both, the encrypted data and the corresponding encrypted keys to the respective data consumer client, is assumed.

In more detail, the non-trusted server receives 4100 from the first client computer 1002 the pseudonymous, encrypted data 1101 and stores 4200 the pseudonymous, encrypted data.

It further receives 4300 from the second client computer 1003 (data consumer) a data request 1202 for the pseudonymous, encrypted data 1101 and finally provides 4400 the pseudonymous, encrypted data 1101 to the second client computer 1003 in response 1203 to the data request.

In other words, the non-trusted server acts as a data exchange platform where any data producer client can upload pseudonymous, encrypted data for data consumer clients which may be interested in such data. The encrypted data is associated with a pseudo ID of the data producer. Further, the non-trusted server may store public keys of all data producing clients in association with their pseudo IDs in a public key database. As described in FIG. 1, the pseudo-ID of a data producer client can also be its public key. Once the non-trusted server has stored the encrypted data, basically any data consumer client can request or download the encrypted data from the server. However, as the data are encrypted with at least one key only known by the respective data producer client, no data consumer client can access the data at this stage. The data producer clients stay anonymous because they are only known by their pseudo IDs or public keys, which may be changed any time. That is, the real identity of a data producing user remains hidden all the time.

Therefore, the non-trusted server also acts as a privacy preserving exchange platform for the respective keys. In this role, the non-trusted server receives 4500 from the second client computer 1003 a signed key request 1204 for at least one key 1301, which is needed to decrypt the encrypted data 1101. This data request may include a public key 1303-*pu* of the second client computer for the purpose of receiving the at least one key encrypted in a way that only the requesting data consumer client can use the at least one key. This is advantageous because otherwise any data consumer client could use any key from the server. In this embodiment the data consuming client may originally include its public key in the singed key request. In another embodiment the non-trusted server may know all public keys of all data consumer clients and can merge the singed key request with the public key of the respective data consumer client before providing the signed key request to the data producer (first) client. Thereby, the non-trusted server can identify the respective data consumer (second) client by its signature and then retrieve the corresponding public key from the public key data base stored on the non-trusted server.

The non-trusted server can now provide the signed key request of the second client to the first client like a key broker. The first client can retrieve the request from the non-trusted server, which allows the first client to stay anonymous, and deliver the requested at least one key encrypted with the public key 1303-*pu* of the second client computer 1003 to the non-trusted server. After the non-trusted server has received the at least one encrypted key it can provide it to the second client for decrypting the encrypted data.

As mentioned earlier, the sequence could also be the other way round where the data consumer first asks for a key to be used for decryption of data which are delivered by the data producer at a later stage. In such scenario, the data consumer client may request a single key or a set of keys which may be valid for a plurality of encrypted data sets being requested afterwards. The data producer satisfying the request can then encrypt all requested data sets related to the respective data request by using the same key or set of keys. In this embodiment the key would only need to be sent once through the non-trusted server to the second (data consumer) client.

Once the non-trusted server has satisfied both, the data request and the key request of the second client, it may again act as a data exchange platform for transaction data related to the consumption of the provided data. It may receive 4810 signed, encrypted transaction data 1102 from the second client computer 1003, wherein the transaction data is encrypted with the public key 1302-*pu* of the first client computer 1002. As described earlier, there are multiple possible embodiments enabling the data consumer client to get into possession of the first client's public key. The server stores 4820 the signed, encrypted transaction data 1102 which again cannot be used by any other data producer than the first client because of the encryption with the respective public key. The transaction data associated with the data consumer by the signature of the second client. Therefore, the non-trusted server can provide the transaction data on request of the first client in transparent way with regards to the origin of the transaction data, which will finally enable the first client to get reimbursed for its data contribution.

Figure 3:
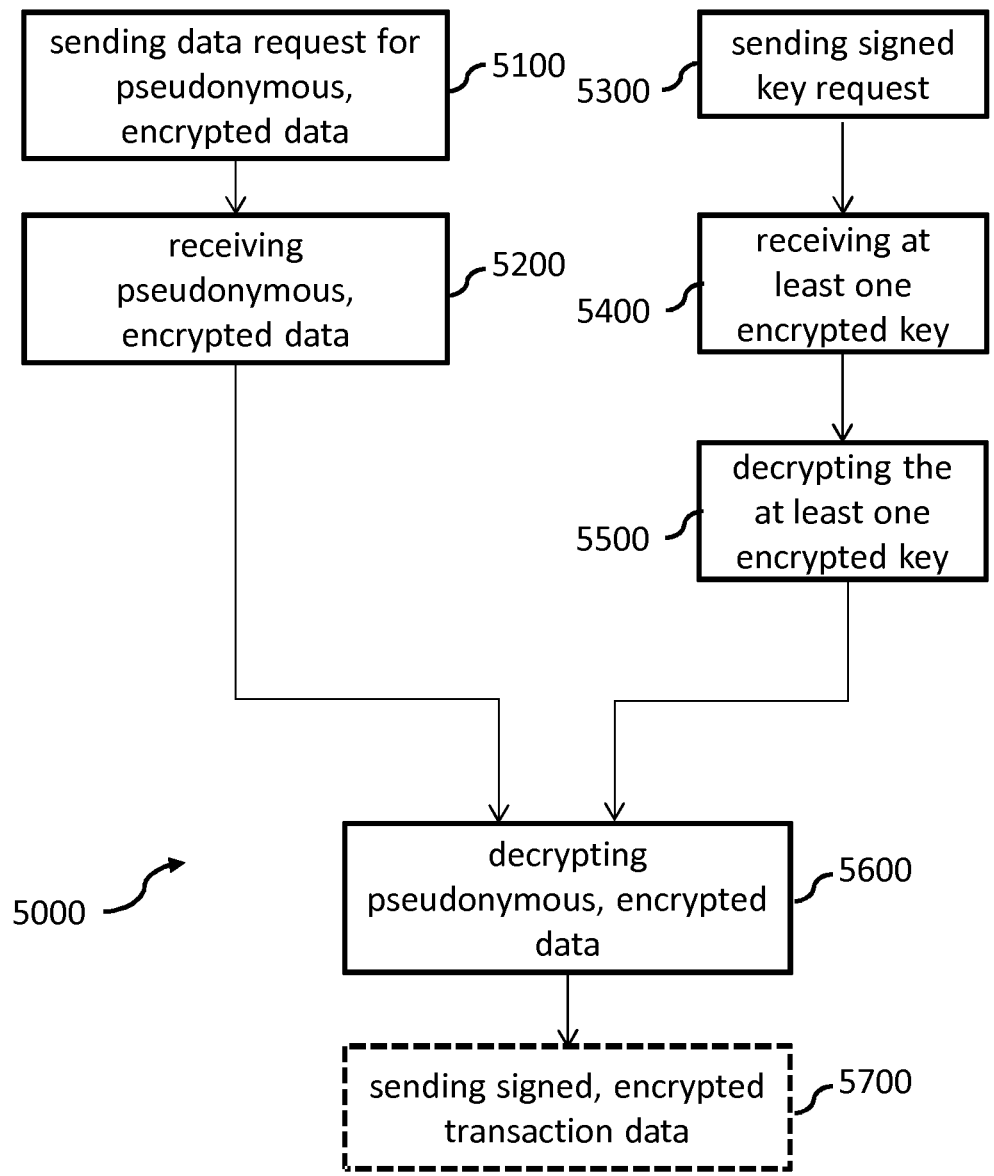
FIG. 3 is a simplified flow chart of a second computer implemented method according to one embodiment of the invention executed by a data consumer client.

FIG. 3 is a simplified flow chart of a second computer implemented method 5000 according to the invention executed by a data consumer client. Again the flowchart illustrates the independence of the encrypted data branch (method steps 5100, 5200) from the signed key request (authorization) branch (steps 5300 to 5500). For the functioning of the various embodiments according to the invention it is not relevant which branch is executed first.

The data consumer client sends 5100 a data request to the non-trusted server and does not care about the data producer finally satisfying the request. The request can be answered by the non-trusted server with the encrypted data originating from a respective data producer received 5200 by the data consumer client. Thereby, the received pseudonymous, encrypted data only reveals a pseudo ID of the data producer client to the data consumer client.

Further, the data consumer client sends 5300 a signed key request for at least one key to the non-trusted server, wherein the at least one key needs to be configured to decrypt the pseudonymous, encrypted data. Otherwise the data consumer client cannot access the received encrypted data. To prevent any other data consumer client from stealing the at least one key from the server, the signed key request further may include the public key of the requesting data consumer client computer. The public key is supposed to be used by the respective data producer client for encrypting the at least one key. In another embodiment the data consumer client may provide its public key separately to the non-trusted server to be merged with the signed key request on the non-trusted server, wherein the signature of the signed key request allows the non-trusted server to retrieve the correct public key for the respective singed key request.

The key request is finally served by the non-trusted server and the data consumer client receives 5400 in response to the signed key request the at least one key, wherein the at least one key was encrypted by the data producer client using the public key of the data consumer client. After having received the encrypted data and having decrypted 5500 the encrypted key by using its own private key which is related to its public key used for the at least one key encryption—no matter in which sequence—the data consumer client can now decrypt 5600 the pseudonymous, encrypted data by using the at least one decrypted key. This way the data consumer client can finally access the data contributed by the data producer client without gaining any knowledge about the data producer's identity beyond the pseudo ID.

The pseudo ID becomes relevant when the data consumer wants to reward the data producer for its data contribution. For this purpose the data consumer client may encrypt the transaction data with a public key 1302-*pu* of the intended recipient, for example, the data producer client computer, to ensure that nobody else may profit from the content of the transaction data. The data consumer client computer may sign the encrypted transaction data 1102 with a signature indicating the origin of the transaction data to the intended recipient and send 5700 the signed, encrypted data to the non-trusted server 1001.

Figure 4:
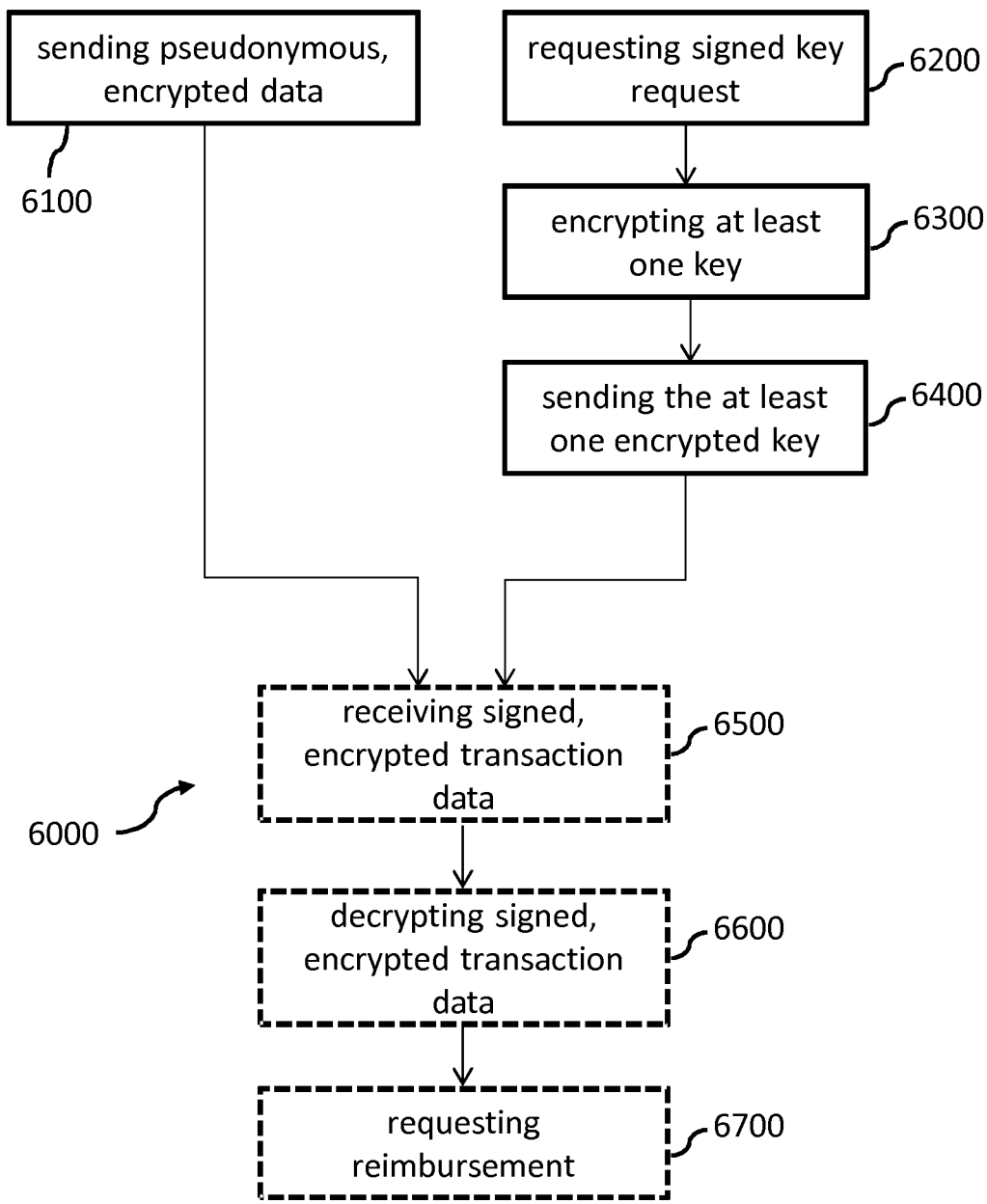
FIG. 4 is a simplified flow chart of a third computer implemented method according to one embodiment of the invention executed by a data producer client.

FIG. 4 is a simplified flow chart of a third computer implemented method 6000 according to the invention executed by a data producer client. The data producer client is motivated to contribute data to the data exchange platform but wants to stay anonymous at the same time. The motivation of the data producer for contributing data may even be higher if he can get some reimbursement for the data contributions. One concern of the data producer thereby is to receive the reimbursement but still stay unknown to the data consuming users in the system.

The data producer client can therefore send 6100 the data to be contributed to the non-trusted server data exchange platform. Thereby, the identity of the data producer is hidden by using a pseudo-ID. The pseudo-ID can be any unique identifier including a public key of the data producer client created through a public key infrastructure. Further, to avoid that any data consumer may retrieve the data from the non-trusted server, the data producer client encrypts the data with at least one key which is exclusively known by the data producer, so that nobody who would retrieve the encrypted data from the non-trusted server, could make any sense out of the data without the at least one key. For data encryption, advantageously any symmetric secure encryption method can be applied. The data producer can send the data voluntarily to the non-trusted server hoping that there will be a future need for the data or the data may be sent in response to a request originating from a data consumer client and provided by the non-trusted server.

If a data consumer client is interested in the data it may send a corresponding signed key request to the non-trusted server. The data producer client can then request 6200 from the non-trusted server computer the signed key request (originating from the data consumer client) for the at least one key, which is needed by the data consumer to decrypt the pseudonymous, encrypted data. This key request may also be received by the data producer client before the respective encrypted data is sent to the non-trusted server. It does not matter, whether the data producer is pushing the data first or whether the data consumer is first requesting a key for a whole set of future data contributions. In both embodiments the methods according to the invention equally apply. The signature of the key request allows the data producer to learn about the identity of the requesting data consumer client. Therefore, the data producer can make his own choice with respect to responding to the request or not. For example, if the data producer is not interested to support the requesting data consumer he may simply ignore the request and the data consumer client will not be able to access the encrypted data finally.

The signed key request further includes a public key of the data consumer client computer which may then be used by the data producer client to encrypt 6300 the at least one key with the public key of the data consumer client to avoid that anybody else than the requesting data consumer client can use the at least one key. If the data producer client wants to allow the requesting data consumer client to access the encrypted data, the data producer client finally sends 6400 the at least one encrypted key to the non-trusted server exchange platform.

In case a reimbursement for the data contribution is available to the data producer, the data producer client may receive 6500 encrypted transaction data from the non-trusted server computer originating from the data consumer client, wherein the transaction data is encrypted with the public key of the data producer client computer and wherein the transaction data is signed by the data consumer client computer allowing the data producer to validate the identity of the originator of the transaction data. To enable the encryption of the transaction data with the public key of the data producer client, the data producer client may provide its public key at some time to the non-trusted server. The data producer client may also use the public key as its pseudo ID. In this embodiment the public key automatically arrives at the data consumer client together with the pseudonymous, encrypted data.

The data producer client can then decrypt 6600 the signed, encrypted transaction data using its own private key which is related to its public key provided previously for encrypting the transaction data. The data producer now knows the transaction value, which will be reimbursed for a specific transaction. Transaction in this context relates to the provisioning of the encrypted data together with the respective keys for accessing the data and the use of the data by the respective data consumer client. The data producer client can finally request 6700 a reimbursement from a reimbursement entity in accordance with the decrypted transaction data. As the reimbursement entity is not related to the data consumer client, the privacy of the data producer is preserved throughout the whole process but at the same time accountability is established with regards to the reimbursement, which allows the data producer to be rewarded for his data contributions.

Figure 5:
FIG. 5 illustrates the inner structure of transaction data.

FIG. 5 illustrates the inner structure of transaction data 1102. The transaction data may include at least one transaction number. This transaction number is a unique identifier, which is related to certain data or sets of data that were contributed by a data producer client and finally accessed and consumed by the data consumer client. The transaction value represents the value related to the contributed data, which should be paid out to the data producer. The transaction number is used by the data producer client versus the reimbursement entity to request reimbursement for the contributed data. Further, the transaction number can be used by the reimbursement entity to prove versus the data consumer client that the reimbursement was paid out to a data producer. For example, each data consumer may have an account at the reimbursement entity and the paid out amounts corresponding to the transaction values may automatically be booked against the respective accounts. For this purpose the data producer client can forward the signature of the data consumer client to the reimbursement entity allowing the reimbursement entity to identify the correct account for the respective transaction number. In another embodiment the data consumer provides all its issued transaction numbers to the reimbursement entity and the reimbursement entity can simply map the transaction number received from the data producer client against the list of all transaction numbers to identify the correct data consumer account. In this case the data producer does not need to forward any information about the data consumer to the reimbursement entity. Again, no relation exists between the reimbursement entity and the data consuming clients which could take the privacy of the data producing client at risk.

Figure 6:
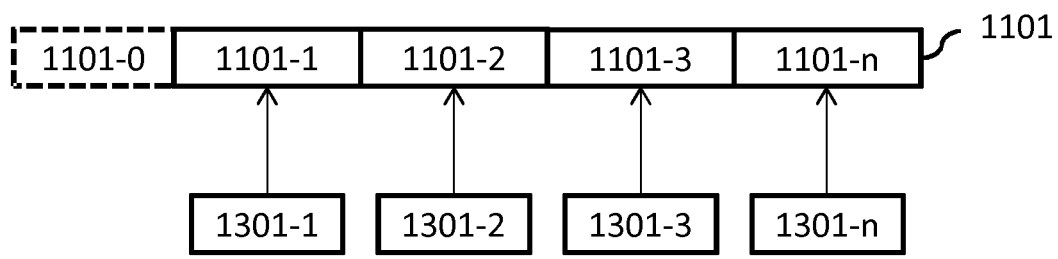
FIG. 6 shows an example of using multiple key encryption for pseudonymous, encrypted data.

FIG. 6 shows an example of using multiple key encryption for pseudonymous, encrypted data from a data producer client. The example shows pseudonymous, encrypted data 1101, where different data sections 1101-1 to 1101-n are encrypted with different keys 1301-1 to 1301-n, respectively. Further, the data may also include one or more non encrypted sections 1101-0. For example, the non-encrypted data portion may indicate which types of data or data categories are included in the encrypted portions. Some examples of types or categories are: geographic data relating the data sets to certain geographic regions; types of data such as environmental data with sensor data regarding pollution levels, behavioral data regarding crowd behavior at large events or situational data in the case of disasters. Any other type or category of data or meta-data which may be useful to serve as selection criteria for the relevance of encrypted data to a specific data consumer client may be used. Therefore, a data consumer may only be interested in a subset of the pseudonymous, encrypted data 1101 and request keys 1301-1, 1301-2 for decryption of the first two data subsets 1101-1, 1101-2. For example, the non-encrypted data portion 11-01 indicates that the first two subsets may refer to two geographic areas falling into the responsibility of a certain metropolitan authority. In another example the two data subsets can refer to environmental sensor data and situational data after a gas explosion in an urban area where a city authority tries to get a situational picture of gas concentration and mobile sensor density values for deriving movement patterns in the respective area.

An advantage of having multiple data sets included in the pseudonymous, encrypted data 1101 is that data producers can contribute a whole vector of data encrypted with various keys at one moment in time and different data consumers all being interested in different subsets of the data need only to request the respective keys for the subsets they are interested in. This way they can consume only those data subsets which are relevant to them and reimburse the respective data producers only for the data they actually consume. Another advantageous embodiment for multiple data sets with encryption vector is that a data producer can decide anytime to prevent a certain data consumer client form accessing a specific value (data subset) by simply changing the respective key and communicating the key change to all other data consumers but not the one to be excluded from using the data.

Embodiments of the invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program of claim 13, can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network. The methods described under FIGS. 2 to 4 can all be executed by corresponding computer products on the respective devices, e.g., the non-trusted server, data producer client computers and the data consumer client computers.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computer are at least one processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Such storage devices may also provisioned on demand and be accessible through the Internet (Cloud Computing). Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a cathode ray tube (CRT) or liquid crystal display (LCD) monitor, for displaying information to the user and an input device such as a keyboard, touchscreen or touchpad, a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. Client computers can also be mobile devices, such as smartphones, tablet PCs or any other handheld computing device. The components of the system can be interconnected by any form or medium of digital data communication, e.g., a communication network. Examples of communication networks include a local area network (LAN) and a wide area network (WAN), e.g., the Internet or wireless LAN or telecommunication networks.

The computing system can include clients and servers. A client and server are generally remote from each other and typically interact through a communication network. The relationship of client and server arises by virtue of computer programs running on the respective computers and having a client-server relationship to each other.

The invention claimed is:

1. A computer implemented method (4000) on a server computer (1001) for preserving privacy and accountability, comprising:
    receiving (4100) from a first client computer (1002) pseudonymous, encrypted data (1101);
    storing (4200) the pseudonymous, encrypted data (1101) at the server computer (1001);
    receiving (4300) from a second client computer (1003) a data request (1202) for the pseudonymous, encrypted data (1101);
    providing (4400) the pseudonymous, encrypted data (1101) to the second client computer (1003) in response (1203) to the data request;
    receiving (4500) from the second client computer (1003) a signed key request (1204) for at least one key (1301), wherein the at least one key (1301) to be configured to decrypt the pseudonymous, encrypted data (1101) and wherein the signed key request (1204) comprises a public key (1303-pu) of the second client computer (1003);
    receiving (4600) from the first client computer (1002) the at least one key, wherein the at least one key (1301) is encrypted with the public key (1303-pu) of the second client computer (1003); and
    providing (4700) the encrypted at least one key to the second client computer (1003) in response to the signed key request.

2. The method (4000) of claim 1, further comprising:
    receiving (4810) from the second client computer (1003) signed, encrypted transaction data (1102), wherein the signed, encrypted transaction data is encrypted with a public key (1302-pu) of the first client computer (1002);
    storing (4820) the signed, encrypted transaction data (1102) at the server computer (1001); and
    providing (4830) the signed, encrypted transaction data (1102) to the first client computer (1002) on request of the first client computer (1002).

3. The method (4000) of claim 2, wherein the signed encrypted transaction data (1102) comprises a transaction number and a transaction value.

4. The method (4000) of claim 2 or 3, wherein the first client computer (1002) is configured to decrypt the signed, encrypted transaction data (1102) using a private key (1302-pr) which is related to the public key (1302-pu) of the first client computer (1002).

5. The method (4000) of claim 2, wherein the first client computer (1002) is configured to request (4840) a reimbursement from a reimbursement entity (1004) in accordance with the decrypted transaction data (1102a).

6. The method (4000) of claim 1, wherein the second client computer (1003) is configured to decrypt the at least one encrypted key (1301) by using a private key (1303-pr) which is related to the public key (1303-pu) of the second client computer (1003), and is further configured to decrypt the pseudonymous, encrypted data (1101) by using the at least one decrypted key (1301a).

7. The method (4000) of claim 1, wherein the second client computer (1003) requests and receives further pseudonymous, encrypted data provided by the first client computer (1002) while still using the already decrypted at least one key (1301a).

8. The method (4000) of claim 1, wherein the at least one key (1301) becomes invalid after a predefined validity interval.

9. The method (4000) of claim 1, wherein the at least one key (1301) becomes invalid upon an invalidation action of the first client computer (1002).

10. The method (4000) of claim 1, wherein the pseudonymous, encrypted data (1101) comprises a plurality of data sets (1101-1, 1101-2, 1101-3, 1101-n), each data set (1101-1, 1101-2, 1101-3, 1101-n) being encrypted with a separate key (1301-1, 1301-2, 1301-3, 1301-n).

11. The method (4000) of claim 10, wherein the second client computer (1003) receives only a subset of the plurality of separate keys.

12. The method (4000) of claim 1, wherein the pseudonymous, encrypted data (1101) is associated with non-encrypted data (1101-0), wherein the non-encrypted data (1101-0) is configured to categorize or classify the pseudonymous, encrypted data (1101).

13. The method (4000) of claim 1, wherein the server computer (1001) is a non-trusted server computer.

14. A non-transitory computer program product that when loaded into a memory of a computing device and executed by at least one processor of the computing device executes the steps of a computer implemented method for preserving privacy and accountability, comprising:
    receiving (4100) from a first client computer (1002) pseudonymous, encrypted data (1101);
    storing (4200) the pseudonymous, encrypted data (1101) at the server computer (1001);
    receiving (4300) from a second client computer (1003) a data request (1202) for the pseudonymous, encrypted data (1101):
    providing (4400) the pseudonymous, encrypted data (1101) to the second client computer (1003) in response (1203) to the data request;
    receiving (4500) from the second client computer (1003) a signed key request (1204) for at least one key (1301), wherein the at least one key (1301) to be configured to decrypt the pseudonymous, encrypted data (1101) and wherein the signed key request (1204) comprises a public key (1303-pu) of the second client computer (1003);
    receiving (4600) from the first client computer (1002) the at least one key, wherein the at least one key (1301) is encrypted with the public key (1303-pu) of the second client computer (1003); and providing (4700) the encrypted at least one key to the second client computer (1003) in response to the signed key request.

15. A server computer (1001) comprising:
an interface component (1011) configured:
- to receive (4100) from a first client computer (1002) pseudonymous, encrypted data (1101) and further;
- to receive (4300) from a second client computer (1003) a data request (1202) for the pseudonymous, encrypted data (1101);
- to provide (4400) the pseudonymous, encrypted data (1101) to the second client computer (1003) in response (1203) to the data request (1202);
- to receive (4500) from the second client computer (1003) a signed key request (1204) for at least one key (1301), wherein the at least one key (1301) is to be configured to decrypt the pseudonymous, encrypted data (1101) and wherein the signed key request (1204) comprises a public key (1303-*pu*) of the second client computer (1003);
- to receive (4600) from the first client computer (1002) the at least one key (1301), wherein the at least one key (1301) is encrypted with the public key (1303-*pu*) of the second client computer (1003); and
- to provide (4700) the at least one encrypted key (1301) to the second client computer (1003) in response (1206) to the signed key request (1204); and a data storage component (1031) configured to store (4200) the pseudonymous, encrypted data (1101) at the server computer (1001).

16. The server computer (1001) of claim 15, wherein:
the interface component (1011) is further configured:
- to receive (4810) from the second client computer (1003) signed, encrypted transaction data (1102), wherein the transaction data is encrypted with a public key (1302-*pu*) of the first client computer (1002); and
- to provide (4830) the signed, encrypted transaction data (1102) to the first client computer (1002); and the data storage component (1031) is further configured to store (4820) the signed, encrypted transaction data (1102) at the server computer (1001).

17. A data consumer client computer (1003), comprising:
an interface component (1013) configured:
- to send a data request (1202) for pseudonymous, encrypted data (1101) to a server computer (1001), wherein the pseudonymous, encrypted data (1101) originate from a data producer client computer (1002);
- to receive in response (1203) to the data request (1202) the pseudonymous, encrypted data (1101) from the server computer (1001);
- to send a signed key request (1204) for at least one key (1301), wherein the at least one key (1301) is to be configured to decrypt the pseudonymous, encrypted data (1101) and wherein the signed key request (1204) comprises a public key (1303-*pu*) of the data consumer client computer (1003);
- to receive in response (1206) to the signed key request (1204) the at least one key (1301) from the server computer, wherein the at least one key is encrypted with the public key (1303-*pu*) of the data consumer client computer (1003); and a data processing component (1023) configured:
- to decrypt the at least one encrypted key (1301) by using a private key (1303-*pr*) which is related to the public key (1303-*pu*) of the data consumer client computer; and
- to decrypt the pseudonymous, encrypted data (1101) by using the at least one decrypted key (1301*a*).

18. The data consumer client computer (1003) of claim 17, wherein:
the interface component (1013) is further configured:
- to send signed, encrypted transaction data (1102) to the server (1001); and the data processing component (1023) is further configured:
- to encrypt the transaction data with a public key (1302-*pu*) of the data producer client computer (1002).

19. A data producer client computer (1002), comprising:
an interface component (1012) configured:
- to send pseudonymous, encrypted data (1001) to a server computer (1001);
- to receive from the server computer (1001) a signed key request for at least one key (1301), wherein the at least one key (1301) is to be configured to decrypt the pseudonymous, encrypted data (1101) and wherein the signed key request comprises a public key (1303-*pu*) of a data consumer client computer (1003); and
- to send the at least one key (1301) to the server computer (1001), wherein the at least one key (1301) is encrypted with the public key (1303-*pu*) of the data consumer client computer (1003); and a data processing component (1022) configured:
- to encrypt the at least one key with the public key (1303-*pu*) of the data consumer client computer (1003).

20. The data producer client computer of claim 19, wherein:
the interface component (1012) is further configured:
- to receive from the server computer (1001) encrypted transaction data (1102), wherein the transaction data (1102) is encrypted with a public key (1302-*pu*) of the data producer client computer (1002) and wherein the transaction data (1102) is signed by the data consumer client computer (1003); and the data processing component (1022) is further configured
- to decrypt the signed, encrypted transaction data (1102) using a private key (1302-*pr*) which is related to the public key (1302-*pu*) of the data producer client computer (1002).

21. The data producer client computer of claim 20, wherein:
the interface component (1012) is further configured to request (4840) a reimbursement from a reimbursement entity (1004) in accordance with the decrypted transaction data (1102*a*).

* * * * *